US012734565B2

(12) United States Patent
Vaccarezza et al.

(10) Patent No.: US 12,734,565 B2
(45) Date of Patent: Sep. 15, 2026

(54) ORE PELLETIZING COMPOSITIONS, DEVICES, SYSTEMS, AND METHODS USING AUTOMOTIVE PAINT SLUDGE AS A BINDER

(71) Applicant: COLORADO SCHOOL OF MINES, Golden, CO (US)

(72) Inventors: Victoria Vaccarezza, Golden, CO (US); Corby Anderson, Golden, CO (US)

(73) Assignee: Colorado School of Mines, Golden, CO (US)

( * ) Notice: Subject to any disclaimer, the term of this patent is extended or adjusted under 35 U.S.C. 154(b) by 682 days.

(21) Appl. No.: 18/052,487

(22) Filed: Nov. 3, 2022

(65) Prior Publication Data

US 2023/0139417 A1 May 4, 2023

Related U.S. Application Data

(60) Provisional application No. 63/263,496, filed on Nov. 3, 2021.

(51) Int. Cl.

| | |
|---|---|
| ***B09B 3/25*** | (2022.01) |
| ***B09B 3/40*** | (2022.01) |
| ***C02F 11/08*** | (2006.01) |
| ***C22B 1/24*** | (2006.01) |
| ***C22B 1/243*** | (2006.01) |
| *B09B 101/05* | (2022.01) |

(52) U.S. Cl.

CPC .................. *B09B 3/25* (2022.01); *B09B 3/40* (2022.01); *C02F 11/08* (2013.01); *C22B 1/2406* (2013.01); *C22B 1/243* (2013.01); *B09B 2101/05* (2022.01)

(58) Field of Classification Search

CPC ........... B09B 3/25; B09B 3/40; C22B 1/2406; C22B 1/243; C02F 11/08

See application file for complete search history.

(56) References Cited

FOREIGN PATENT DOCUMENTS

| | | | | |
|---|---|---|---|---|
| CN | 112853091 A * | 5/2021 | ............. | C22B 1/248 |
| KR | 100298685 B1 * | 9/2001 | ................ | C10L 5/04 |

OTHER PUBLICATIONS

CN 112853091 A. Machine translation of the bibliography, claims, and description. (Year: 2021).*

KR 100298685 B1. Machine translation. (Year: 2001).*

Marton, Csaba & Holger Alwast. "Report: Operational experiences and legal aspects of co-combustion in Germany." Waste Manage Res. 20. pp. 476-483. (Year: 2002).*

(Continued)

*Primary Examiner* — Tima M. McGuthry-Banks

(74) *Attorney, Agent, or Firm* — Dorsey & Whitney LLP

(57) ABSTRACT

Disclosed herein are methods and compositions useful in recycling automotive paint sludge in the formation of ore pellets. In many embodiments, the pellets are iron ore pellets comprising magnetite ore, and one or more of limestone and bentonite. The automotive paint sludge may be water based or other solvent based. In many embodiments, the disclosed methods and compositions may result in pelletized ore with performance characteristics (hardness, resistance to breakage, porosity, reduction, etc.) that are similar or superior to pelletized ore lacking paint sludge.

20 Claims, 7 Drawing Sheets

(56) References Cited

OTHER PUBLICATIONS

Papassavva, et al., “Characterization of Automotive Paints: An Environmental Impact Analysis”, Progress in Organic Coatings, vol. 43, No. 1-3, pp. 193-206, 2001.
Salihoglu, et al., “A Review on Paint Sludge from Automotive Industries: Generation, Characteristics and Management”, Journal of Environmental Management, vol. 169, pp. 223-235, 2016.

* cited by examiner

CCS for Batch 2 pellets

Cold Crushing Strength (kg/pellet)

300
250
200
150
100
50
0

0PS_1B_3LS
1PS_1B_3LS
0PS_0B_3LS
1PS_0B_3LS
0PS_1B_0LS
1PS_1B_0LS
0PS_0B_0LS
1PS_0B_0LS
0.5PS_0.5B_1.5LS

870 C
1150 C
1010 C

Dry vs. Fired Batch 2 pellets at 1150°C

Crushing Strength (kg/pellet)

300
250
200
150
100
50
0

0PS_1B_3LS
1PS_1B_3LS
0PS_0B_3LS
1PS_0B_3LS
0PS_1B_0LS
1PS_1B_0LS
0PS_0B_0LS
1PS_0B_0LS

Dry Pellets
Fired Pellets

Drop Test for Batch 2 pellets

Drop Number per fired pellet 0
2
4
6
8
10
12

0PS_1B_3LS
1PS_1B_3LS
0PS_0B_3LS
1PS_0B_3LS
0PS_1B_0LS
1PS_1B_0LS
0PS_0B_0LS
1PS_0B_0LS
0.5PS_0.5B_1.5LS

870 C
1150 C
1010 C

ORE PELLETIZING COMPOSITIONS, DEVICES, SYSTEMS, AND METHODS USING AUTOMOTIVE PAINT SLUDGE AS A BINDER

CROSS-REFERENCE TO RELATED APPLICATIONS

This application claims the benefit of priority to U.S. Provisional Patent Application No. 63/263,496, filed Nov. 3, 2021, entitled "MAGNETITE ORE PELLETING COMPOSITIONS, DEVICES, SYSTEMS, AND METHODS USING AUTOMOTIVE PAINT SLUDGE AS A BINDER", the disclosure of which is hereby incorporated by reference in its entirety for all purposes.

FIELD

The disclosed compositions, devices, processes, methods, and systems are directed to pelletizing ore.

BACKGROUND

Due to environmental and economic concerns, there has been a large push to investigate recycling applications for automotive paint sludge. Automotive paint sludge is considered a nuisance and hazardous waste material within the automotive industry around the world.

Automotive paint sludge is a by-product of overspray in the painting booths. Paint sludge can be either water-based or other solvent-based, however, both types contain a combination of inorganic and organic material. The designation of waterborne or solvent-based depends on the type of paint material, i.e., if the paint is contained in a water base, it is waterborne.

What is needed is applications that can aid in recycling automotive paint sludge in useful ways.

SUMMARY

Disclosed herein are methods of recycling automotive paint sludge, the methods comprising steps including combining automotive paint sludge with an ore to create an ore composition; shaping the ore composition to form a pellet; and drying the pellet to aid in hardening the pellet, wherein the combining step may also include adding bentonite and/or limestone to the composition. In many embodiments, the ore may be selected from magnetite ore, hematite ore, or combinations thereof, and the clay may be an expanding clay, for example a clay comprising phyllosilicate. The ore composition may also comprise one or more compounds from Table 1.1 or 1.2, and the drying temperature may be greater than about 850° C. and less than about 1200° C., for example greater than 1000° C. In many embodiments, the disclosed methods may result in pelletized ore with performance characteristics (hardness, resistance to breakage, porosity, reduction, etc.) that may be similar or superior to methods that do not include ore compositions comprising paint sludge.

Also disclosed are methods of pelletizing an ore, the methods comprising the steps of combining automotive paint sludge with the ore to create an ore composition; shaping the ore composition to form a pellet; and drying the pellet to aid in hardening the pellet, wherein the combining step may also include bentonite and/or limestone. In many embodiments, the ore may be selected from magnetite ore, hematite ore, or combinations thereof, and the clay may be an expanding clay, for example a clay comprising phyllosilicate. The ore composition may also comprise one or more compounds from Table 1.1 or 1.2, and the drying temperature may be greater than about 850° C. and less than about 1200° C., for example greater than 1000° C. In many embodiments, the disclosed compositions may result in pelletized ore with performance characteristics (hardness, resistance to breakage, porosity, reduction, etc.) that may be similar or superior to existing pellets that do not include paint sludge.

Also disclosed are ore pellets comprising an automotive paint sludge and an ore, wherein the ore may comprise a clay and/or limestone. In many embodiments, the ore may be selected from magnetite ore, hematite ore, or combinations thereof, and the clay may be an expanding clay, for example a clay comprising phyllosilicate. In many embodiments, the clay may be bentonite. In many embodiments, the disclosed methods may result in pelletized ore with performance characteristics (hardness, resistance to breakage, porosity, reduction, etc.) that may be similar or superior to methods that do not include ore compositions comprising paint sludge.

DETAILED DESCRIPTION

Figure 1:
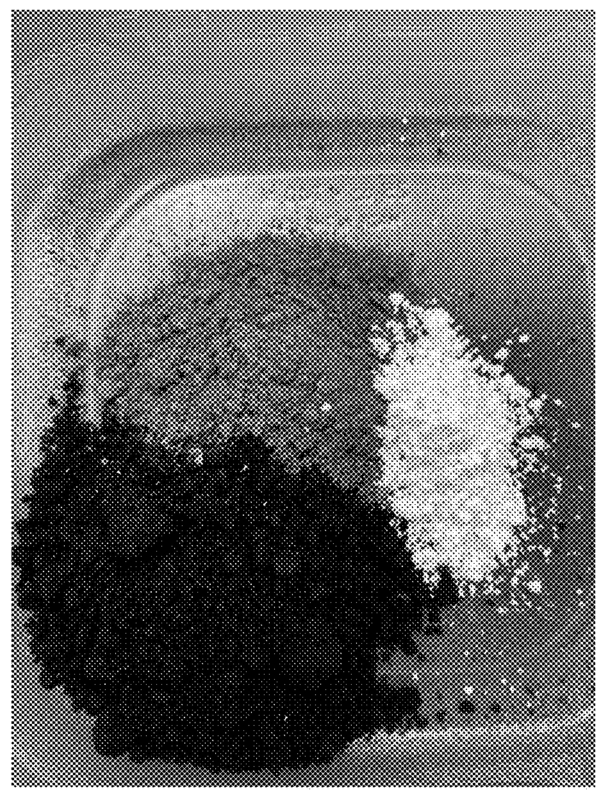
FIG. 1. Combination of materials: paint sludge (gray), magnetite ore (black) and limestone (white).

Described herein are methods, systems, and compositions for pelletizing magnetite. In many embodiments, the compositions may comprise one or more of paint sludge, limestone, bentonite, magnetite and combinations thereof. In many embodiments, the disclosed pellets may be dried and/or sintered at a temperature above about 850° C. and below about 1200° C., for greater than about 15 minutes and less than about 2 hrs. In many embodiments, the resulting magnetite pellets may have characteristics equivalent or superior to magnetite pellets made using existing methods or existing compositions. In many embodiments, the disclosed pellets may exhibit a resistance to compression that is equivalent or superior to pellets comprising existing compositions and made from existing methods. In many embodiments, the The focus of this project was to investigate and develop a recycling application that would employ the use of the automotive paint sludge material as received. The paint sludge was used as a binder for iron ore pellets, typically used for iron- and steelmaking. The development of the type of recycling application conducted during this project was aided by a review of different binders used in iron ore pellets, as well as the various techniques used to recycle automotive paint sludge materials.

Two different paint sludge samples were characterized for their organic and inorganic components. It was then determined to be a possible substitute for the standard iron ore pellet binder: bentonite clay. Unlike bentonite, paint sludge has half the concentration of silica and alumina, which are detriments in the ironmaking process. Iron ore pellets were made using magnetite ore, 1.0-3.0 wt. % limestone, 0.0-1.0 wt. % bentonite, and 0.0-1.0 wt. % paint sludge from two different paint shops. The pellet recipes were evaluated via a statistical analysis software where low, middle and high material weight percentages were output to ensure optimized results. The iron ore pellets with paint sludge material as a binder were then tested for their standard physical and chemical properties to make sure they were comparable to pellets made with bentonite clay.

Magnetite ore contains iron oxides with the chemical formula $Fe_3O_4$ and is ferromagnetic. In most cases, iron ore pelletizing uses either magnetite ore or hematite ore. Generally, other type of ores containing magnetite or hematite as minor constituents would be avoided, unless the ore was processed to increase the concentration of magnetite or hematite and remove other minerals. In most cases, the term limestone refers to calcium carbonate, in less preferred embodiments, other types of calcium carbonates can be used.

Various types of bentonite clay can be used in the present embodiments, for example sodium bentonite, calcium bentonite, potassium bentonite, and combinations thereof. In most embodiments, the bentonite may be predominantly phyllosilicate minerals, such as montmorillonite.

Automotive paint sludge is a by-product of overspray in the painting booths. Paint sludge is either water-based or solvent-based, however, both types contain a combination of inorganic and organic material. The designation of waterborne or solvent-based depends on the type of paint material, i.e., if the paint is contained in a water base, it is waterborne. Both types of paint sludge may further comprise one or more of uncured polymer resins, metal-containing pigments, curing agents, flotation agents, detackifiers and water. Some examples of components and compounds found in automotive paint sludge are disclosed at Table 1.1. Waterborne paint sludge has been promoted as the environmentally friendly option in comparison, but the entire vehicle painting process does still rely on organic materials. It is for this reason the generation of automotive paint sludge, regardless of its base, is considered one of the largest contributors of hazardous waste in the automotive industry.

TABLE 1.1

Chemical compositions of flocculants and two detackifiers.

| Flocculant | | Detackifier for water-based paint sludge | | Detackifier for solvent-based paint sludge | |
|---|---|---|---|---|---|
| Content | Level (%) | Content | Level (%) | Content | Level (%) |
| Acetic acid | 10 | Aluminum sulfate | 20 | Aluminum sulfate | 20 |
| Ammonium chloride | 3 | Ammonium, diallyl-dimethyl-, chloride, polymers | 0.25 | Amines, polyethyl-enepoly-, polymers with 1,2-dichloro-ethane | 0.25 |

However, the new millennia also brought new environmental concerns across all industries, as well as increases in fees for the storage of hazardous material. In response, the automotive industry has become the leader in promoting zero waste. This has also led many, if not all, automotive companies to seek other techniques for recycling their paint sludge. Previous research methods include attempting to extract valuable metals or utilizing it for construction materials.

Iron ore pellets are used in the steel making process with bentonite clay as the current industry standard binder. This investigation seeks to develop comparable iron ore pellets with a paint sludge binder by employing similar testing techniques used for traditional iron ore pellets.

In addition to the experimental results presented, the implications of these results will be discussed as they relate to the two major ironmaking methods: blast furnace and direct reduction. The blast furnace (BF) is considered an indirect reduction of iron in combination with a converter, while direct reduction produces direct reduced iron (DRI). It is critical to examine how the use of a different iron ore pellet binder affects the ironmaking process in both the blast furnace and direct reduction processes since each has differences in feed requirements and allowances.

The goal of this research project was to investigate the effectiveness of using waterborne automotive paint sludge as a binder for making iron ore pellets. The typical binder used for iron ore pellets is bentonite clay, however, due to the high costs and low availability, alternatives to bentonite clay have been researched for years. Bentonite clay also increases the concentration of silica and alumina, which are considered detrimental in the downstream ironmaking process. Too much silica and alumina increase the acidity of the slag while it is being processed in a blast furnace. Increased slag acidity increases the viscosity of the slag and the difficultly in tapping the slag. This is not a superficial issue that can be easily solved since the operations of a blast furnace cannot be turned on and off easily. In addition to the issues associated with the blast furnace, pellets for use in DRI should also not contain high concentrations of silica or alumina because there is not a lot of room of impurities or to resolve the impurities within the DRI process.

Many of the previously investigated alternative binders were sought to eliminate or limit the silica and alumina. Organic materials, such as polymers, have been intensely studied as an alternative binder to bentonite clay because their long chains can hold together the pellets similar to bentonite. Because they are organic material, they may also add heat to the BF or DRI process, aiding in the energy costs. However, organic materials are very expensive, and, in many cases, the cost associated with creating an organic binder for the amount of pellets used cannot be justified. For these reasons, Applicants focused on automotive paint sludge for a technical and economical alternative binder. It not only contains a substantial amount of organic material, including polymers, and low amount of silica and alumina, but is also economically favorable for automotive companies.

Recycling of automotive paint sludge is an important topic of late because many automotive companies are trying to reduce the amount of waste placed in landfills. The paint sludge consists of organic and inorganic material, in this case, mostly titanium dioxide with significantly lower percentages of silica and alumina compared to bentonite. To test how well the paint sludge could substitute as a binder compared to bentonite, iron ore pellets were made of typical industrial standard with and without bentonite. These pellets were subject to a crushing strength test, a drop test, determination of apparent porosity and percent reduction. All these properties are considered important for the durability and efficiency of the iron ore pellets. It was determined that iron ore pellets where the bentonite was completely and partially replaced with paint sludge materials (sourced, for the present studies, from two different paint shops), had comparable cold crushing strength values above 250 kg/pellet as per industry standards. Cold crushing is done after the pellets are "indurated" or "fired" at a temperature higher than 1000° C. and then cooled so they are technically "cold." In addition to the cold crushing strength values, the pellets also withstood multiple drops above 8 drop which is also typical of industry standards. Apparent porosity and percent reduction were also determined to have suitable values showing that paint sludge can replace bentonite as a binder.

The disclosed pelletizing methods and compositions may include the use of paint sludge. In many embodiments, the paint sludge may be water-based or solvent-based paint. In some embodiments, paint sludge may further include one or more of the compounds shown in Table 1.1. The amount of paint sludge in the pellet may be from about 0.0-2.0 wt. % of the pellet, for example from about 0.5 to 1.0 wt %, for example greater than about 0.01 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.4 wt %, 0.6 wt %, 0.8 wt %, 1.0 wt %, 1.2 wt %, 1.4 wt %, 1.6 wt %, or 1.8 wt % paint sludge and less than about 2.2 wt %, 2.0 wt %, 1.8 wt %, 1.6 wt %, 1.4 wt %, 1.2 wt %, 1.0 wt %, 0.8 wt %, 0.6 wt %, 0.4 wt %, 0.2 wt %, 0.1 wt %, 0.09 wt %, 0.08 wt %, 0.07 wt %, 0.06 wt %, 0.05 wt %, 0.04 wt %, 0.03 wt %, or 0.02 wt % paint sludge.

TABLE 1.2

Chemical composition of three solvent-based paints.

| Material | Level (%)[a] | Level (%)[b] | Level (%)[c] |
|---|---|---|---|
| n-buthyl acetate | 35 | 3 | |
| xylene | 5 | 18 | 41.64 |
| butan-1-ol | 3 | 14 | |
| 1,3,5-triazine-2,4,6-triamine, polymer with formaldehyde | 20 | | |
| butylated ethylbenzene | 1 | 1 | |
| naphta (petroleum), hydrotreated light | 1 | 3 | |
| 2-(2-butoxyethoxy) ethanol | 1 | | |
| heptane | 1 | | |
| naphta (petroleum) light alkylate | 0.25 | | |
| solvent naphta (petroleum) light a. | 0.25 | | |
| naphta (petroleum) hydrodesulphurized heavy | 0.25 | | |
| 1,2,4-trimethylbenzene | 0.25 | | |
| solvent naphta (petroleum), medium aliphatic | 0.2 | | |
| methanol | | 2 | |
| melamine formaldehyde | | 12 | |
| cumene | | 1 | |
| 3-methacryloxypropy-trimethoxy-silane | | 5 | |
| polymethylmethacrylate | | 42 | |
| carbon black | | | 3.15 |
| calcium carbonate | | | 8.97 |
| thickener | | | 2.97 |
| triethylamine | | | 0.32 |
| toluene | | | 19.92 |
| drying agents | | | 1.59 |
| talc | | | 9.98 |
| polycarboxylic acid | | | 0.54 |
| methyl-ethyl-cetoxime | | | 0.16 |
| bonding agent | | | 1 |

[a] Composition of the paint used at automotive plant in Turkey.
[b] Composition of the paint produced by DuPont.
[c] Composition of the paint reported by Arce et al. (2010).

The disclosed pelletizing methods and compositions may include the use of a clay. In many embodiments, the clay may be an expanding clay, a clay comprising phyllosilicates, a clay comprising montmorillonite, and combinations thereof. In some embodiments, the clay may be bentonite. The amount of bentonite in the pellet may be from about 0.0-2.0 wt. % of the pellet, for example from about 0.5 to 1.0 wt %, for example greater than about 0.01 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.4 wt %, 0.6 wt %, 0.8 wt %, 1.0 wt %, 1.2 wt %, 1.4 wt %, 1.6 wt %, or 1.8 wt % bentonite and less than about 2.2 wt %, 2.0 wt %, 1.8 wt %, 1.6 wt %, 1.4 wt %, 1.2 wt %, 1.0 wt %, 0.8 wt %, 0.6 wt %, 0.4 wt %, 0.2 wt %, 0.1 wt %, 0.09 wt %, 0.08 wt %, 0.07 wt %, 0.06 wt %, 0.05 wt %, 0.04 wt %, 0.03 wt %, or 0.02 wt % bentonite.

The disclosed pelletizing methods and compositions may include the use of limestone. In some embodiments, the amount of limestone may be from about 0.0-5.0 wt. % of the pellet, for example from about 0.5 to 3.0 wt %, for example greater than about 0.01 wt %, 0.01 wt %, 0.02 wt %, 0.03 wt %, 0.04 wt %, 0.05 wt %, 0.06 wt %, 0.07 wt %, 0.08 wt %, 0.09 wt %, 0.1 wt %, 0.2 wt %, 0.4 wt %, 0.6 wt %, 0.8 wt %, 1.0 wt %, 1.2 wt %, 1.4 wt %, 1.6 wt %, 1.8 wt %, 2.0 wt %, 2.2 wt %, 2.4 wt %, 2.6 wt %, 2.8 wt %, 3.0 wt %, 3.2 wt %, 3.4 wt %, 3.6 wt %, 3.8 wt %, 4.0 wt %, 4.2 wt %, 4.4 wt %, 4.6 wt %, 4.8 wt %, or 4.9 wt % limestone and less than about 5.0 wt %, 4.8 wt %, 4.6 wt %, 4.4 wt %, 4.2 wt %, 4.0 wt %, 3.8 wt %, 3.6 wt %, 3.4 wt %, 3.2 wt %, 3.0 wt %, 2.8 wt %, 2.6 wt %, 2.4 wt %, 2.2 wt %, 2.0 wt %, 1.8 wt %, 1.6 wt %, 1.4 wt %, 1.2 wt %, 1.0 wt %, 0.8 wt %, 0.6 wt %, 0.4 wt %, 0.2 wt %, 0.1 wt %, 0.09 wt %, 0.08 wt %, 0.07 wt %, 0.06 wt %, 0.05 wt %, 0.04 wt %, 0.03 wt %, or 0.02 wt % limestone. In some embodiments, limestone may refer to substantially pure calcium carbonate.

Various temperatures may be used to dry, cure, or sinter the pellet after formation. In many embodiments, the temperature may be from about 850° C. to about 1200° C., for example 870° C. to about 1150° C., such as greater than about 850° C., 870° C., 890° C., 910° C., 930° C., 950° C., 970° C., 990° C., 1010° C., 1030° C., 1050° C., 1070° C., 1090° C., 1110° C., 1130° C., 1150° C., 1170° C., 1190° C., or 1210° C., and less than about 1220, 1210° C., 1190° C., 1170° C., 1150° C., 1130° C., 1110° C., 1090° C., 1070° C., 1050° C., 1030° C., 1010° C., 990° C., 970° C., 950° C., 930° C., 910° C., 890° C., 870° C., or 860° C.

The pellets may be dried, cured, or sintered for various times. In many embodiments the pellets are dried for more than 15 minutes and less than about 2 hrs, for example about 30 to about 90 minutes, such as greater than 10 min, 20 min, 30 min, 40 min, 50 min, 60 min, 70 min, 80 min, 90 min, 100 min, 110 min, or 115 min, and less than about 130 min, 12 min, 110 min, 100 min, 90 min, 80 min, 70 min, 60 min, 50 min, 40 min, 30 min, or 20 min. The term 'about' may modify the number by +/−1-10%, for example 1-5%.

EXAMPLES

Example 1—Design of Experiments

A 2n half-factorial design was chosen for this project due to insufficient raw materials for the experiments, where "n" is the number of controllable factors included in the experiment by the user. The controllable factors included weight percent addition of paint sludge, weight percent addition of bentonite, weight percent addition of limestone, temperature of induration and time of induration. The values of each factor were chosen based on current industry values, the literature review, as well as the project's experimental need. In putting the information into Stat-Ease, the following DOE was produced shown in Table 1.3.

TABLE 1.3

Design of experiments for iron ore pellets with paint sludge binder.

| | Facter 1: Temperature (Celsius) | Factor 2: Paint Sludge addition (wt. %) | Factor 3: Bentonite addition (wt. %) | Factor 4: Limestone addition (wt. %) | Factor 5: Induration Time (minutes) |
|---|---|---|---|---|---|
| High | 1150 | 1.0 | 1.0 | 3.0 | 90 |
| Mid | 1010 | 0.5 | 0.5 | 1.5 | 60 |
| Low | 870 | 0.0 | 0.0 | 0.0 | 30 |

TABLE 2

Half- Factorial Design Order for Batch 1 of Paint Sludge.

| Run | Factor 1: Temperature (Celsius) | Factor 2: Paint Sludge addition (wt. %) | Factor 3: Bentonite addition (wt. %) | Factor 4: Limestone addition (wt. %) | Factor 5: Induration Time (minutes) |
|---|---|---|---|---|---|
| 1 | 1150 | 1 | 0 | 0 | 90 |
| 2 | 1010 | 0.5 | 0.5 | 1.5 | 60 |
| 3 | 870 | 0 | 1 | 3 | 90 |
| 4 | 1150 | 0 | 0 | 3 | 90 |
| 5 | 870 | 1 | 1 | 3 | 30 |
| 6 | 1150 | 0 | 1 | 3 | 30 |
| 7 | 870 | 0 | 0 | 3 | 30 |
| 8 | 870 | 1 | 0 | 3 | 90 |
| 9 | 1150 | 0 | 1 | 0 | 90 |
| 10 | 870 | 0 | 1 | 0 | 30 |
| 11 | 870 | 1 | 1 | 0 | 90 |
| 12 | 1150 | 1 | 1 | 3 | 90 |
| 13 | 1010 | 0.5 | 0.5 | 1.5 | 60 |
| 14 | 1010 | 0.5 | 0.5 | 1.5 | 60 |
| 15 | 1150 | 0 | 0 | 0 | 30 |
| 16 | 1150 | 1 | 1 | 0 | 30 |
| 17 | 870 | 0 | 0 | 0 | 90 |
| 18 | 1150 | 1 | 0 | 3 | 30 |
| 19 | 870 | 1 | 0 | 0 | 30 |

As seen in Table 2, a total of 19 runs were done for the first batch of paint sludge. A second sample was labeled as batch 2 of paint sludge and the half-factorial design is presented in Table 3. This presented with another set of 19 runs, totaling 38 between both samples of paint sludge. Runs 1-19 represent batch 1, while runs 20-38 represent batch 2.

TABLE 3

Half-Factorial Design Order for Batch 2 of Paint Sludge.

| Run | Factor 1: Temperature (Celsius) | Factor 2: Paint Sludge addition (wt. %) | Factor 3: Bentonite addition (wt. %) | Factor 4: Limestone addition (wt. %) | Factor 5: Induration Time (minutes) |
|---|---|---|---|---|---|
| 20 | 1150 | 1 | 0 | 0 | 90 |
| 21 | 1010 | 0.5 | 0.5 | 1.5 | 60 |
| 22 | 870 | 0 | 1 | 3 | 90 |
| 23 | 1150 | 0 | 0 | 3 | 90 |
| 24 | 870 | 1 | 1 | 3 | 30 |
| 25 | 1150 | 0 | 1 | 3 | 30 |
| 26 | 870 | 0 | 0 | 3 | 30 |
| 27 | 870 | 1 | 0 | 3 | 90 |
| 28 | 1150 | 0 | 1 | 0 | 90 |
| 29 | 870 | 0 | 1 | 0 | 30 |
| 30 | 870 | 1 | 1 | 0 | 90 |
| 31 | 1150 | 1 | 1 | 3 | 90 |
| 32 | 1010 | 0.5 | 0.5 | 1.5 | 60 |
| 33 | 1010 | 0.5 | 0.5 | 1.5 | 60 |
| 34 | 1150 | 0 | 0 | 0 | 30 |
| 35 | 1150 | 1 | 1 | 0 | 30 |
| 36 | 870 | 0 | 0 | 0 | 90 |
| 37 | 1150 | 1 | 0 | 3 | 30 |
| 38 | 870 | 1 | 0 | 0 | 30 |

The responses for this study are shown in Table 4 for all the runs done.

TABLE 4

Responses for half-factorial design order.

| Runs | Response 1: | Response 2: | Response 3: | Response 4: | Response 6: |
|---|---|---|---|---|---|
| 1-38 | Green Crushing Strength (Newtons) | Cold Crushing Strength (CCS) (Newtons) | Drop Test (Number of drops until fracture) | Apparent Porosity (%) | Percent Reduction (%) |

Based on the information from the design of experiments, a variety of magnetite, paint sludge, bentonite and limestone combinations were given. The combinations include:

0 wt. % paint sludge, 0 wt. % bentonite, 0 wt. % limestone, and 100 wt. % magnetite ore.

0 wt. % paint sludge, 1 wt. % bentonite, 0 wt. % limestone, and 99 wt. % magnetite ore.

0 wt. % paint sludge, 0 wt. % bentonite, 3 wt. % limestone, and 97 wt. % magnetite ore.

0 wt. % paint sludge, 1 wt. % bentonite, 3 wt. % limestone, and 96 wt. % magnetite ore.

0.5 wt. % paint sludge, 0.5 wt. % bentonite, 1.5 wt. % limestone, and 97.5 wt. % magnetite ore.

1 wt. % paint sludge, 0 wt. % bentonite, 0 wt. % limestone, and 99 wt. % magnetite ore.

1 wt. % paint sludge, 1 wt. % bentonite, 0 wt. % limestone, and 98 wt. % magnetite ore.

1 wt. % paint sludge, 0 wt. % bentonite, 3 wt. % limestone, and 96 wt. % magnetite ore.

1 wt. % paint sludge, 1 wt. % bentonite, 3 wt. % limestone, and 95 wt. % magnetite ore.

Example 2—Testing Methods

First, the materials were combined and mixed in a Tupperware™ container. A spray bottle is also used to moisten the materials. About 15-25 sprays per 100 grams of total material, which equals to about 1-1.5 mL of water for the specific spray bottle used in this project—or about 1-1.5 mL water per 15-20 pellets. This provided just enough water to wet the material but not enough to overly saturate it. A small amount of material was then taken and rolled into a sphere between the palms of the hand as shown in FIG. 1. As described in the literature review, pellets used in the DRI and blast furnace ironmaking processes are between about 9 and about 16 mm in diameter and the same diameter range was used in this project as well. About 15-20 green pellets (i.e. freshly formed pellets prior to drying or firing) were made from 100 grams of material. This procedure was repeated for all the combinations of paint sludge, bentonite, limestone and magnetite ore provided above. After the green pellets were made, they were dried in a furnace for 12 hours at 100° C. After drying, the pellets are considered dry pellets and placed in a furnace for induration. Based on the design of experiments, specific combinations were fired at different temperatures and times. In many embodiments, pellets may be manufactured using a disc pelletizer.

Pellets with the following combinations of materials were fired at 870° C. for 30 minutes:

0 wt. % paint sludge, 0 wt. % bentonite, 3 wt. % limestone, and 97 wt. % magnetite ore.

0 wt. % paint sludge, 1 wt. % bentonite, 0 wt. % limestone, and 99 wt. % magnetite ore.

1 wt. % paint sludge, 1 wt. % bentonite, 3 wt. % limestone, and 95 wt. % magnetite ore.

1 wt. % paint sludge, 0 wt. % bentonite, 0 wt. % limestone, and 99 wt. % magnetite ore.

Pellets with the following combinations of materials were fired at 870° C. for 90 minutes:

0 wt. % paint sludge, 1 wt. % bentonite, 3 wt. % limestone, and 96 wt. % magnetite ore.

0 wt. % paint sludge, 0 wt. % bentonite, 0 wt. % limestone, and 100 wt. % magnetite ore.

1 wt. % paint sludge, 0 wt. % bentonite, 3 wt. % limestone, and 96 wt. % magnetite ore.

1 wt. % paint sludge, 1 wt. % bentonite, 0 wt. % limestone, and 98 wt. % magnetite ore.

The next set of pellets were fired at 1010° C. for 60 minutes for the following combination of materials:

0.5 wt. % paint sludge, 0.5 wt. % bentonite, 1.5 wt. % limestone, and 97.5 wt. % magnetite ore. Pellets with the following combination of materials were fired at 1150° C. for 30 minutes:

0 wt. % paint sludge, 1 wt. % bentonite, 3 wt. % limestone, and 96 wt. % magnetite ore.

0 wt. % paint sludge, 0 wt. % bentonite, 0 wt. % limestone, and 100 wt. % magnetite ore.

1 wt. % paint sludge, 1 wt. % bentonite, 0 wt. % limestone, and 98 wt. % magnetite ore.

1 wt. % paint sludge, 0 wt. % bentonite, 3 wt. % limestone, and 96 wt. % magnetite ore.

Finally, pellets with the following combination of materials were fired at 1150° C. for 90 minutes:

1 wt. % paint sludge, 0 wt. % bentonite, 0 wt. % limestone, and 99 wt. % magnetite ore.

0 wt. % paint sludge, 0 wt. % bentonite, 3 wt. % limestone, and 97 wt. % magnetite ore.

0 wt. % paint sludge, 1 wt. % bentonite, 0 wt. % limestone, and 99 wt. % magnetite ore.

1 wt. % paint sludge, 1 wt. % bentonite, 3 wt. % limestone, and 96 wt. % magnetite ore.

Example 3—Drop Test Method

When the green pellets were initially made, a drop test was conducted. Drop tests reveal how well the dry and fired pellets will handle transportation during the industrial pelletization process.

Figure 2:
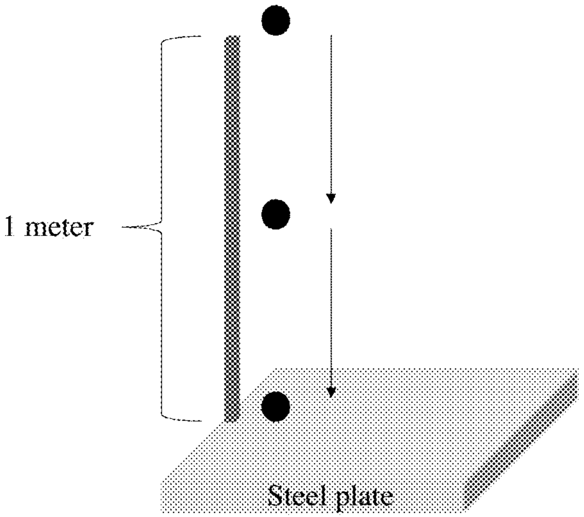
FIG. 2. Schematic representation of drop test.
Figures 3, 4, 5:
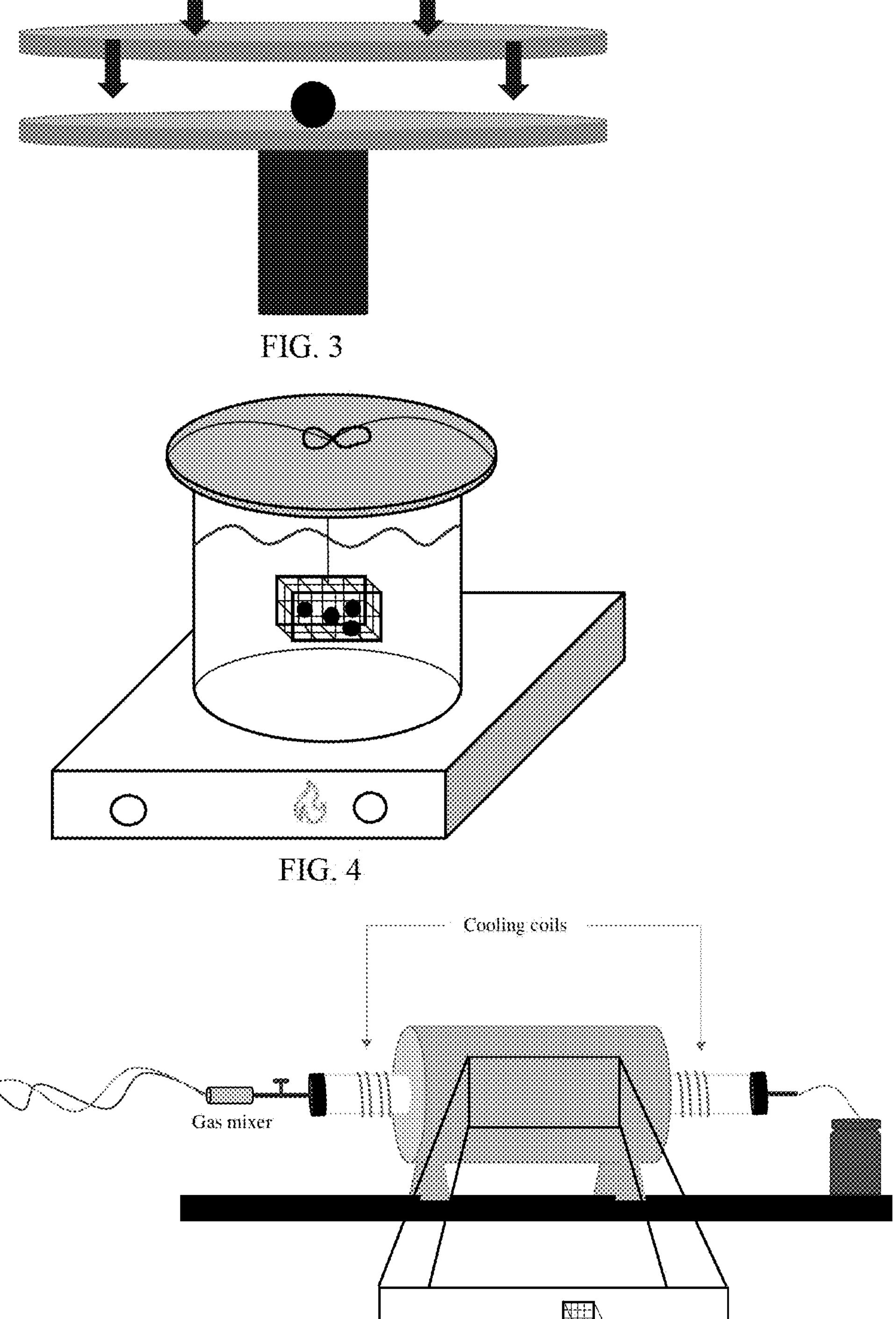
FIG. 3. Schematic diagram of compressive plates and pellet.
FIG. 4. Schematic diagram on saturation process.
FIG. 5. Tube furnace and sample setup for reduction tests.

The pellets were dropped from one meter, measured using a meter stick, onto a steel plate until, counting the number of drops until they fracture. FIG. 2 shows a schematic diagram of the drop test setup. From each combination set, 5 pellets were tested from batch 1 and batch 2 resulting in a total of 90 dry pellets. The average value of each set of 5 was recorded as the drop number for that specific material combination. 5 fired pellets from each of the material combinations for 870° C. for 30 and 90 minutes, 1010° C. for 60 minutes, and 1150° C. for 30 and 90 minutes, were tested and the average drop number was recorded. This was done for batch 1 and batch 2 pellets, resulting in a total of 170 fired pellets tested.

Example 3—Compression Test Method

The compressive strength tests were done in accordance with the ASTM E382-20 Standard Test Method for Determination of Crushing Strength of Iron Ore Pellets and Direct-Reduced Iron. This standard test method is similar to the ISO 4700 standard for cold crushing of iron ore pellets. The crushing strength of an iron ore pellet is determined by applying a load to a pellet at a specific speed until the pellet is fractured.

This compression test was done for all the dry pellets made from each of the 9 material combinations. From each combination set, 5 pellets were tested from each resulting in a total of 90 dry pellets. The average value of each set of 5 was recorded as the crushing strength for that specific material combination. Since the fired pellets were indurated at different temperatures and times, 5 fired pellets from each of the material combinations for 870° C. for 30 and 90 minutes, 1010° C. for 60 minutes, and 1150° C. for 30 and 90 minutes, were tested and the average was recorded. This was done for batch 1 and batch 2 pellets, resulting in a total of 170 fired pellets tested.

Example 4—Porosity Test Method

The procedure used to calculate the apparent porosity of fired pellets is the ASTM C20-00(2015) Standard Test Methods for Apparent Porosity, Water Absorption, Apparent Specific Gravity, and Bulk Density of Burned Refractory Brick and Shapes by Boiling Water [85]. Apparent porosity is the percentage ratio of the void space in a sample to the total bulk volume of the sample. Equation 3 describes the calculation of apparent porosity, Wsat is the weight of saturated sample, Wdry is the weight of the sample in air, and Wsus is the weight of sample suspended in water.

Apparent Porosity,%= $W_{sat}$ monoxide gas valve was opened, and the flow rate was adjusted slowly to 150 mL/min, while the nitrogen gas was increased to 100 mL/min. The ratio of carbon monoxide to nitrogen gas was 60 to 40. At the desired flow rates, the carbon monoxide gas was kept flowing for 30 minutes and then shut closed. The furnace was allowed to cool before the pellets were removed. The pellets were weighed, and their diameters measured using a caliper. Since the pellets are not perfectly spherical, two separate diameters were measured. The pellets were then placed back into the tube furnace and the process was repeated until a weight and diameter measurement was taken after 120 minutes. The same procedure was completed at 900° C. and 950° C. for each of the four-time intervals.

The second procedure involved reducing the pellets determined by the factorial design for batch 1 and batch 2 pellets. Four to five pellets at a time were placed on the metal mesh and then into the tube furnace. The furnace was heated to 950° C. with 50-60 mL/min of nitrogen gas flowing. Once the furnace reached the desired temperature, the carbon monoxide gas was opened and increased to a flow rate of 150 mL/min. The nitrogen gas was also increased to 100 mL/min. Both gases were kept at this rate for one hour. The carbon monoxide was slowly shut off and the nitrogen gas flow was decreased to 50 mL/min while the furnace was cooled down. After the furnace was cooled, the pellets were taken out, weighed and their diameter's measured and recorded. A total of 38 pellet combinations were reduced by this procedure. (19 from each batch with the type of pellet shown below) PS=paint sludge, B=bentonite, LS=limestone. Results are shown at Tables 11 and 12 (Apparent porosity and Percent Reduction of Batch 1 pellets and Batch 2 pellets, respectively).

Example 6—Experimental Results

Table 6 shows the crushing strength values in increasing order for dry and fired pellets made from the paint sludge sample from batch 1. As seen in the table, the biggest indicator of increased cold crushing strength is increased temperature. Most of the values of cold crushing strength above 250 kg/pellet were seen in pellets indurated at 1010° C. and 1150° C. They were also left at that induration temperature for 60 minutes or longer. The type of pellets that pass the 250 kg/pellet threshold are the following:

- 1 wt. % paint sludge, 1 wt. % bentonite, and 0 wt. % limestone
- 1 wt. % paint sludge, 1 wt. % bentonite, and 3 wt. % limestone
- 0 wt. % paint sludge, 1 wt. % bentonite, and 3 wt. % limestone
- 0.5 wt. % paint sludge, 0.5 wt. % bentonite, and 1.5 wt. % limestone
- 1 wt. % paint sludge, 0 wt. % bentonite, and 3 wt. % limestone
- 0 wt. % paint sludge, 0 wt. % bentonite, and 0 wt. % limestone
- 1 wt. % paint sludge, 0 wt. % bentonite, and 0 wt. % limestone Some of this material combinations can also be found in Table 5 to not pass the crushing strength threshold and that is due to low temperature of 870° C. and short induration time.

A question driving this research was if waterborne automotive paint sludge could replace all or some of the bentonite additions made when producing iron ore pellets. Based on the data in Table 21, 0.5PS_0.5B_1.5LS, 1PS_0B_3LS, and 1PS_0B_0LS (numbers are percentages, and PS=paint sludge, B=bentonite, LS=limestone) pellet types prove this to be possible with the paint sludge from batch 1. The pellet type 0PS_0B_0LS is interesting because at 1150° C. for 30 minutes, it does not pass the crushing strength threshold, however, kept at that temperature for 90 minutes, the cold crushing strength increases from 249 to 254. Without wishing to be confined by theory, this result may be due to the small amounts the bentonite phase found in the AMICS analysis of the magnetite ore sample.

TABLE 6

Batch 1 pellet dry and cold crushing strength.

| Pellet Type | Temperature (Celsius) | Time (minutes) | Dry Crushing Strength (kg/pellet) | Cold Crushing Strength (kg/pellet) |
|---|---|---|---|---|
| 0PS-0B-0LS | 870 | 90 | 12 | 197 |
| 0PS-0B-3LS | 870 | 30 | 11 | 210 |
| 0PS-1B-0LS | 870 | 30 | 12 | 219 |
| 1PS-0B-0LS | 870 | 30 | 13 | 219 |
| 0PS-1B-3LS | 870 | 90 | 10 | 240 |
| 1PS-0B-3LS | 870 | 90 | 12 | 245 |
| 0PS-0B-0LS | 1150 | 30 | 26 | 249 |
| 1PS-1B-0LS | 870 | 30 | 11 | 253 |
| 1PS-1B-3LS | 870 | 30 | 13 | 254 |
| 0PS-1B-3LS | 1150 | 30 | 21 | 254 |
| 0PS-1B-0LS | 1150 | 90 | 27 | 254 |
| 1PS-1B-0LS | 1150 | 90 | 14 | 259 |
| 0.5PS-0.5B-1.5LS | 1010 | 60 | 23 | 259 |
| 1PS-0B-3LB | 1150 | 30 | 28 | 261 |
| 0.5PS-0.5B-1.5LS | 1010 | 60 | 21 | 264 |
| 0PS-0B-3LS | 1150 | 90 | 26 | 265 |
| 0.5PS-0.5B-1.5LS | 1010 | 60 | 20 | 268 |
| 1PS-0B-0LS | 1150 | 90 | 29 | 269 |
| 1PS-1B-3LS | 1150 | 90 | 23 | 284 |

Figure 6:
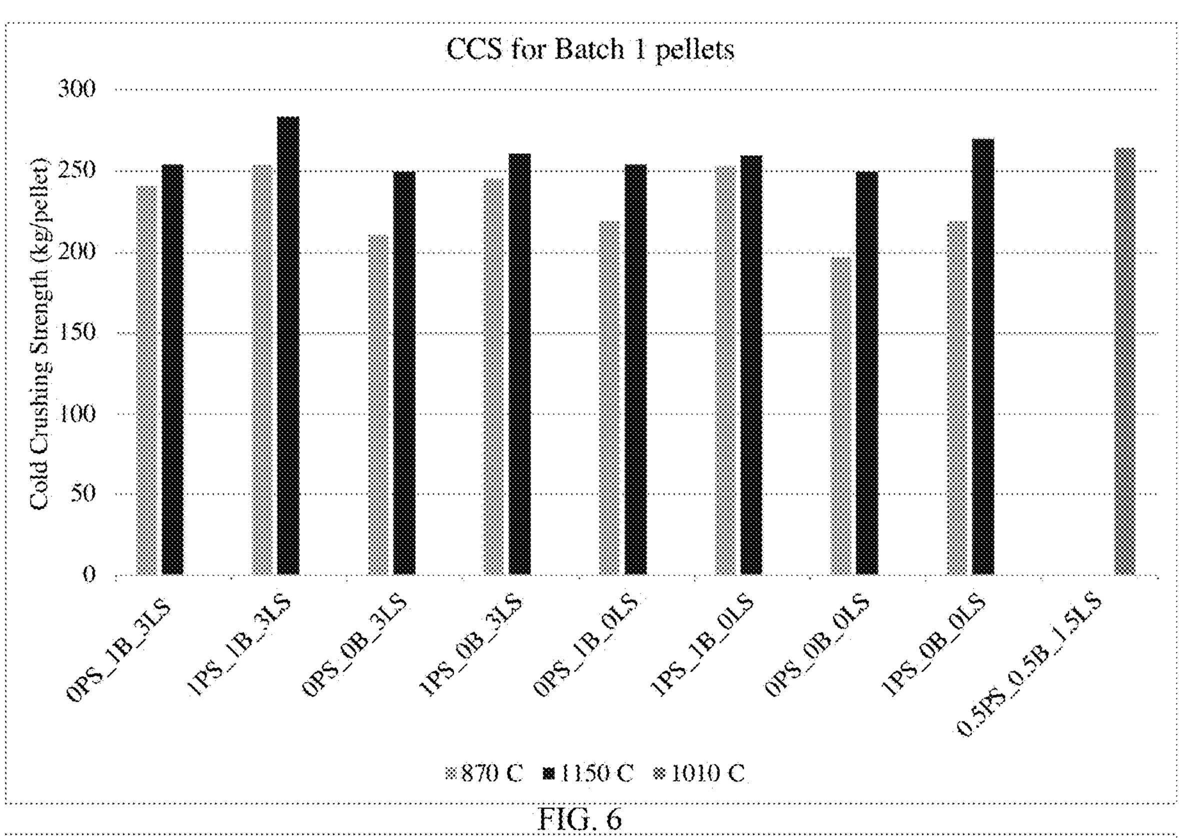
FIG. 6. Cold Crushing Strength (GCS) for batch 1 pellets.

FIG. 6 shows another representation of how different temperatures affect the cold crushing strength of pellets of the same material combinations. In all pellet type combinations, an increase in temperature increases the cold crushing strength. Pellet type 0.5PS_0.5B_1.5LS shows one value of cold crushing strength because it was solely indurated at 1010° C., while the other pellet types were indurated at both 870° C. and 1150° C.

Figure 7:
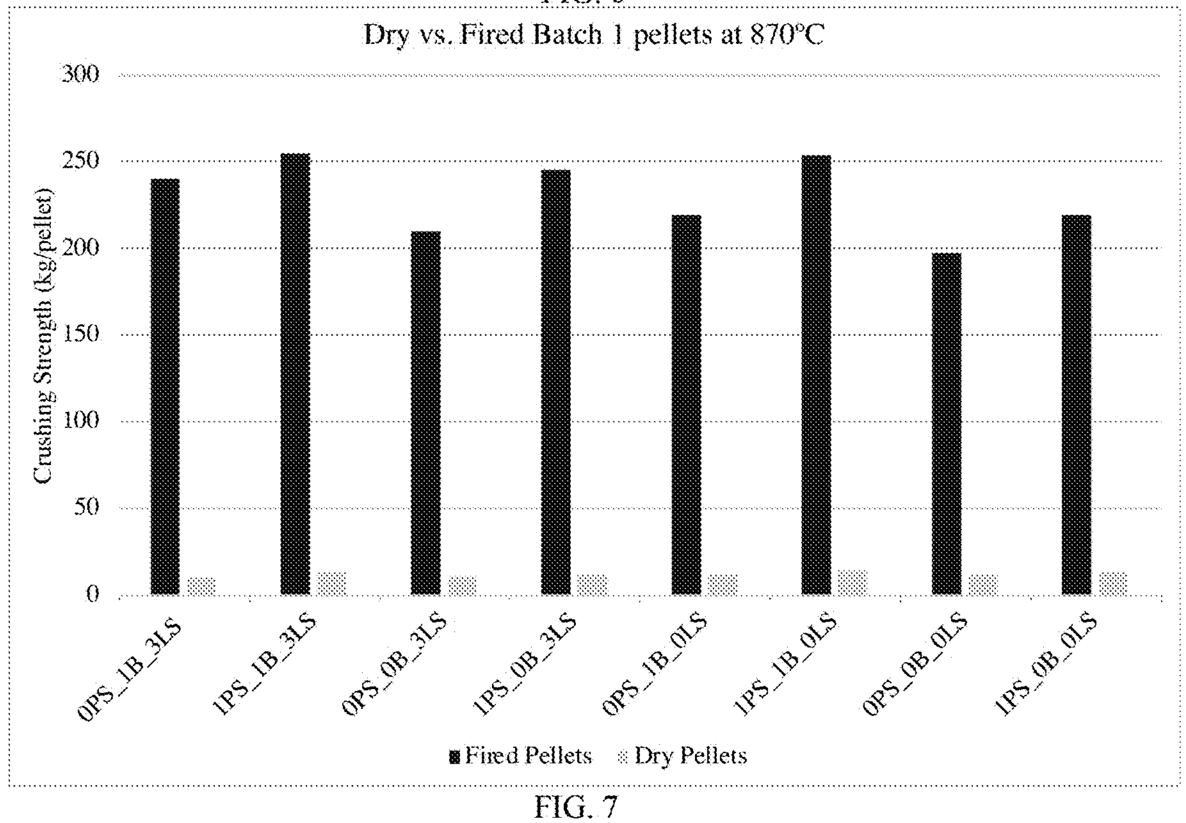
FIG. 7. Crushing Strength of Dry vs. Fired Batch 1 Pellets at 870 C.
Figures 8, 9:
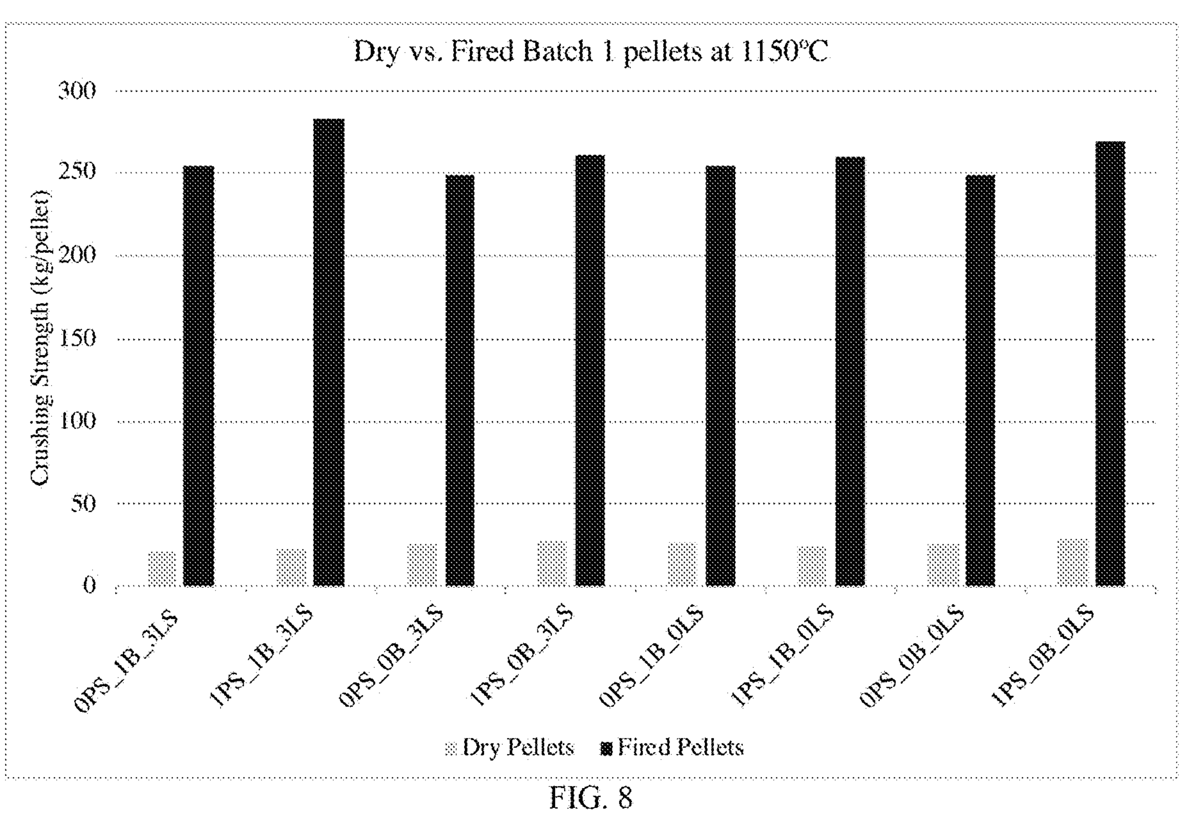
FIG. 8. Crushing Strength of Dry vs. Fired Batch 1 Pellets at 1150 C.
FIG. 9. Cold Crushing Strength for Batch 2 pellets.

A comparison between the crushing strength of dry and fired pellet types are shown in FIG. 7 and FIG. 8, for pellets fired at 870° C. and 1150° C., respectively.

These figures highlight the differences in chemical and physical strengthening mechanisms occurring while the pellet is exposed to different temperatures. A dry pellet is dried at 100° C. and is considered more fragile than green pellets because the capillary forces that held the green pellets together are now gone due to water evaporation. The water evaporation leaves the dry pellets mechanically weakened, and it may be argued that the plasticity behavior once present in the green pellets is now gone. As shown in FIG. 7 and FIG. 8, the dry crushing strength values are significantly lower compared to those fired at 870° C. and 1150° C. However, once the pellets have been indurated, they do become mechanically stronger but for different reasons at the two temperatures. Pellets indurated at 870° C. become denser due to the phase change occurring during the oxidation from magnetite to hematite. On the other hand, pellets indurated at 1150° C. are shown to have higher crushing strength values because of sintering effects. Sintering in iron ore pellets occurs above 1000° C. and is a contributor to the strength of iron ore pellets.

Crushing Strength Test Results for Batch 2 Pellets

Table 8 shows the dry and cold crushing strength values for both dry and fired pellets in increasing cold crushing strength values. As mentioned before, increased temperature is shown to be the biggest indicator of increased pellet cold crushing strength.

The same 250 kg/pellet crushing strength threshold was applied to Table 8 and it shows the following pellet type combinations as passing that value:

0.5 wt. % paint sludge, 0.5 wt. % bentonite, and 1.5 wt. % limestone 1 wt. % paint sludge, 1 wt. % bentonite, and 0 wt. % limestone 1 wt. % paint sludge, 0 wt. % bentonite, and 0 wt. % limestone 1 wt. % paint sludge, 0 wt. % bentonite, and 3 wt. % limestone 0 wt. % paint sludge, 1 wt. % bentonite, and 0 wt. % limestone 1 wt. % paint sludge, 1 wt. % bentonite, and 3 wt. % limestone Some of these pellet type combinations are also seen in Table 8 to have crushing strength values below 250 kg/pellet, but those are due to their low induration temperature of 870° C. All the pellets that had crushing strength values over 250 kg/pellet were indurated at 1010° C. or 1150° C. for 60 minutes or 90 minutes. FIG. 9 is another representation of this as it shows the cold crushing strength increase with increased temperature for pellets of the same material combination.

TABLE 8

Batch 2 pellets dry and cold crushing strength.

| Pellet Type | Temperature (Celsius) | Time (minutes) | Dry Crushing Strength (kg/pellet) | Cold Crushing Strength (kg/pellet) |
|---|---|---|---|---|
| 0PS-0B-0LS | 870 | 90 | 12 | 190 |
| 1PS-1B-3LS | 870 | 30 | 13 | 200 |
| 0PS-0B-3LS | 870 | 30 | 11 | 213 |
| 1PS-0B-0LS | 870 | 30 | 13 | 214 |
| 0PS-1B-0LS | 870 | 30 | 12 | 221 |
| 1PS-1B-0LS | 870 | 30 | 11 | 228 |
| 0PS-0B-0LS | 1150 | 30 | 26 | 230 |
| 1PS-0B-3LS | 870 | 90 | 12 | 245 |
| 0PS-1B-3LS | 870 | 90 | 10 | 249 |
| 0PS-0B-3LS | 1150 | 90 | 26 | 249 |
| 0.5PS-0.5B-1.5LS | 1010 | 60 | 23 | 262 |
| 1PS-1B-0LS | 1150 | 90 | 14 | 264 |
| 1PS-0B-0LS | 1150 | 90 | 29 | 265 |
| 0.5PS-0.5B-1.5LS | 1010 | 60 | 20 | 268 |
| 1PS-0B-3LS | 1150 | 30 | 28 | 270 |
| 0.5PS-0.5B-1.5LS | 1010 | 60 | 21 | 273 |
| 0PS-1B-0LS | 1150 | 90 | 27 | 276 |

TABLE 8-continued

Batch 2 pellets dry and cold crushing strength.

| Pellet Type | Temperature (Celsius) | Time (minutes) | Dry Crushing Strength (kg/pellet) | Cold Crushing Strength (kg/pellet) |
|---|---|---|---|---|
| 1PS-1B-3LS | 1150 | 30 | 13 | 278 |
| 1PS-1B-3LS | 1150 | 90 | 23 | 284 |

Figures 10, 11:
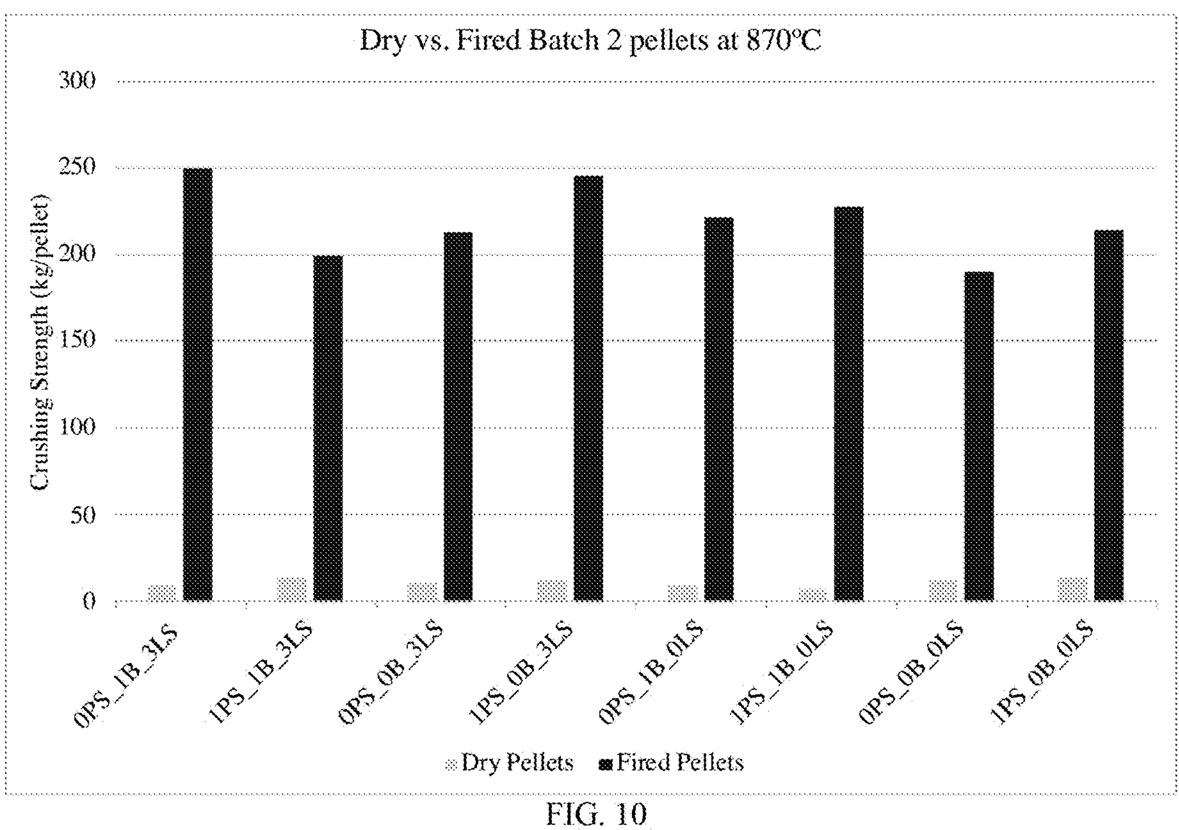
FIG. 10. Crushing Strength for Dry vs. Fired Batch 2 Pellets at 870 C.
FIG. 11. Crushing Strength for Dry vs. Fired Batch 2 Pellets at 1150 C.

FIG. 10 and FIG. 11 show the crushing strength for dry and fired pellets indurated at 870° C. and 1150° C., respectively. As mentioned in the previous section, differences in dry and cold crushing strength are most likely due to water evaporation in the dry pellets and the formation of denser hematite pellets at 870° C. Of course, as the temperature increased to 1150° C., sintering effects begin to substantially strengthen the pellets compared to what is seen at 870° C.

Drop Test Results for Batch 1 Pellets

A drop or impact test is conducted on the pellets as another measure in determining how well the pellets will withstand transportation and handling. Most literature data suggest drop number values over 8 as durable for fired pellets. The drop test differs from the compression test in that the pellet is free falling and, typically, one part of the pellet is impacted at a time.

Table 9 shows the drop test numbers for dry and fired pellets in increasing drop number for fired pellets. All the pellet types that passed the 8 drop number value were pellets indurated a high temperature: 1010° C. and 1150° C. In Table 9 we see that some of the pellets that pass the drop number threshold were pellets with no additions of bentonite, and consisted of paint sludge, magnetite, and/or limestone (e.g., 1PS_0B_3LS and 1PS_0B_0LS) or half of the bentonite addition was replaced with paint sludge (0.5PS_0.5B_1.5LS). It can be concluded then that magnetite ore pellets substituted completely or partially with automotive paint sludge still display impact values comparable to pellets with bentonite clay.

TABLE 9

Drop number for dry and fired batch 1 pellets.

| Pellet Type | Temperature (Celsius) | Time (minutes) | Drop number for dry pellets | Drop number for fired pellets |
|---|---|---|---|---|
| 0PS-0B-0LS | 1150 | 30 | 1 | 1 |
| 0PS-1B-0LS | 870 | 30 | 1 | 4 |
| 1PS-0B-0LS | 870 | 30 | 2 | 4 |
| 1PS-1B-3LS | 870 | 30 | 4 | 4 |
| 0PS-1B-3LS | 870 | 90 | 2 | 5 |
| 0PS-0B-3LS | 870 | 30 | 4 | 5 |
| 1PS-1B-0LS | 870 | 30 | 1 | 7 |
| 0PS-0B-0LS | 870 | 90 | 2 | 7 |
| 1PS-0B-3LS | 870 | 90 | 3 | 7 |
| 0.5PS-0.5B-1.5LS | 1010 | 60 | 6 | 9 |
| 1PS-0B-3LS | 1150 | 30 | 6 | 9 |
| 0PS-1B-3LS | 1150 | 30 | 7 | 9 |
| 0PS-0B-3LS | 1150 | 90 | 5 | 10 |
| 0PS-1B-0LS | 1150 | 90 | 6 | 10 |
| 0.5PS-0.5B-1.5LS | 1010 | 60 | 7 | 10 |
| 1PS-1B-3LS | 1150 | 90 | 4 | 11 |
| 1PS-1B-0LS | 1150 | 90 | 6 | 11 |
| 1PS-0B-0LS | 1150 | 90 | 5 | 12 |
| 0.5PS-0.5B-1.5LS | 1010 | 60 | 5 | 12 |

Figures 12, 13:
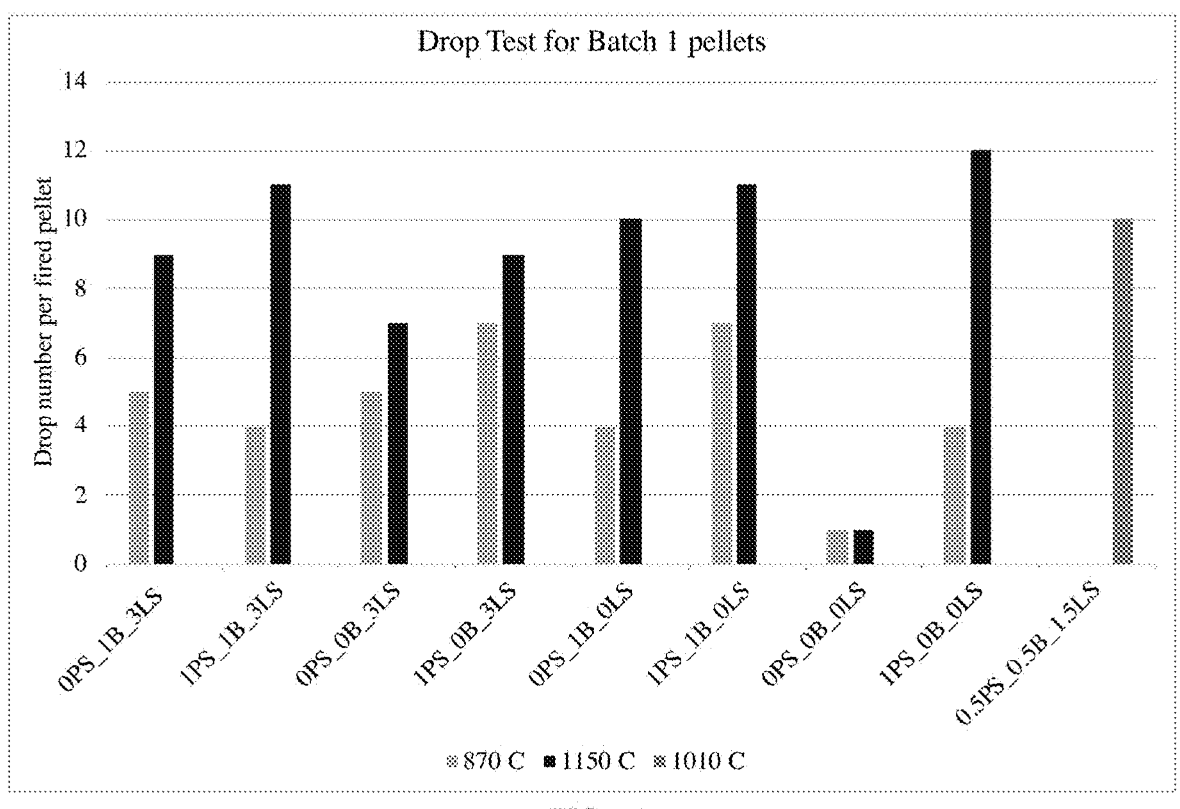
FIG. 12. Drop Test Numbers for Fired Batch 1 Pellets.
FIG. 13. Drop Test Numbers for Fired Batch 2 Pellets.

FIG. 12 shows the drop test values for fired pellets made from batch 1 paint sludge material for induration temperatures 870° C., 1010° C., 1150° C. This graph shows the temperature dependence again, implying the importance of sintering in the strengthening of iron ore pellets. The pellet type 0PS_0B_0LS does not show any promising impact values, most likely due to the lack of bentonite and paint sludge materials.

Drop Test Results for Batch 2 Pellets

As discussed in the section before, the same drop number of 8 is considered the durable threshold for suitable iron ore pellets. Most of the pellets that pass this threshold value are pellets indurated at 1010° C. and 1150° C. where sintering effects significantly increase the strength and hardness of a pellet. Table 10 shows pellet type combinations that do not include the addition of bentonite or the partial addition of bentonite (e.g., 0.5PS_0.5B_1.5LS and 1PS_0B_0LS, and 1PS_0B_3LS), indicating the paint sludge material as a suitable complete or partial substitution.

TABLE 10

Drop number for dry and fired batch 2 pellets.

| Pellet Type | Temper-ature (Celsius) | Time (minutes) | Drop Number for dry pellets | Drop Number for fired pellets |
|---|---|---|---|---|
| 0PS-0B-0LS | 870 | 90 | 2 | 2 |
| 0PS-0B-0LS | 1150 | 30 | 2 | 3 |
| 0PS-0B-3LS | 870 | 30 | 2 | 4 |
| 0PS-1B-0LS | 870 | 30 | 2 | 4 |
| 1PS-1B-0LS | 870 | 30 | 2 | 5 |
| 1PS-0B-3LS | 870 | 90 | 3 | 5 |
| 1PS-1B-3LS | 870 | 30 | 3 | 5 |
| 0PS-1B-3LS | 870 | 90 | 2 | 6 |
| 0PS-1B-0LS | 1150 | 90 | 7 | 9 |
| 0.5PS-0.5B-1.5LS | 1010 | 60 | 5 | 10 |
| 0PS-0B-3LS | 1150 | 90 | 6 | 10 |
| 1PS-1B-3LS | 1150 | 90 | 7 | 10 |
| 0.5PS-0.5B-1.5LS | 1010 | 60 | 8 | 10 |
| 1PS-0B-0LS | 870 | 30 | 2 | 11 |
| 1PS-0B-3LS | 1150 | 30 | 5 | 11 |
| 1PS-0B-0LS | 1150 | 90 | 6 | 11 |
| 0.5PS-0.5B-1.5LS | 1010 | 60 | 6 | 11 |
| 0PS-1B-3LS | 1150 | 30 | 7 | 11 |
| 1PS-1B-0LS | 1150 | 90 | 7 | 11 |

FIG. 13 displays the drop number values for fired pellets from batch 2 paint sludge material indurated at 870° C., 1010° C. and 1150° C. While not all the fired pellets drop number, values pass the 8 drop threshold, it does show how the temperature dependence; the pellets withstand more drops as their induration temperature increases. The pellet type 0PS_0B_0LS cannot withstand numerous drops due to the lack of bentonite and paint sludge material to strengthen the pellets.

Figure 14:
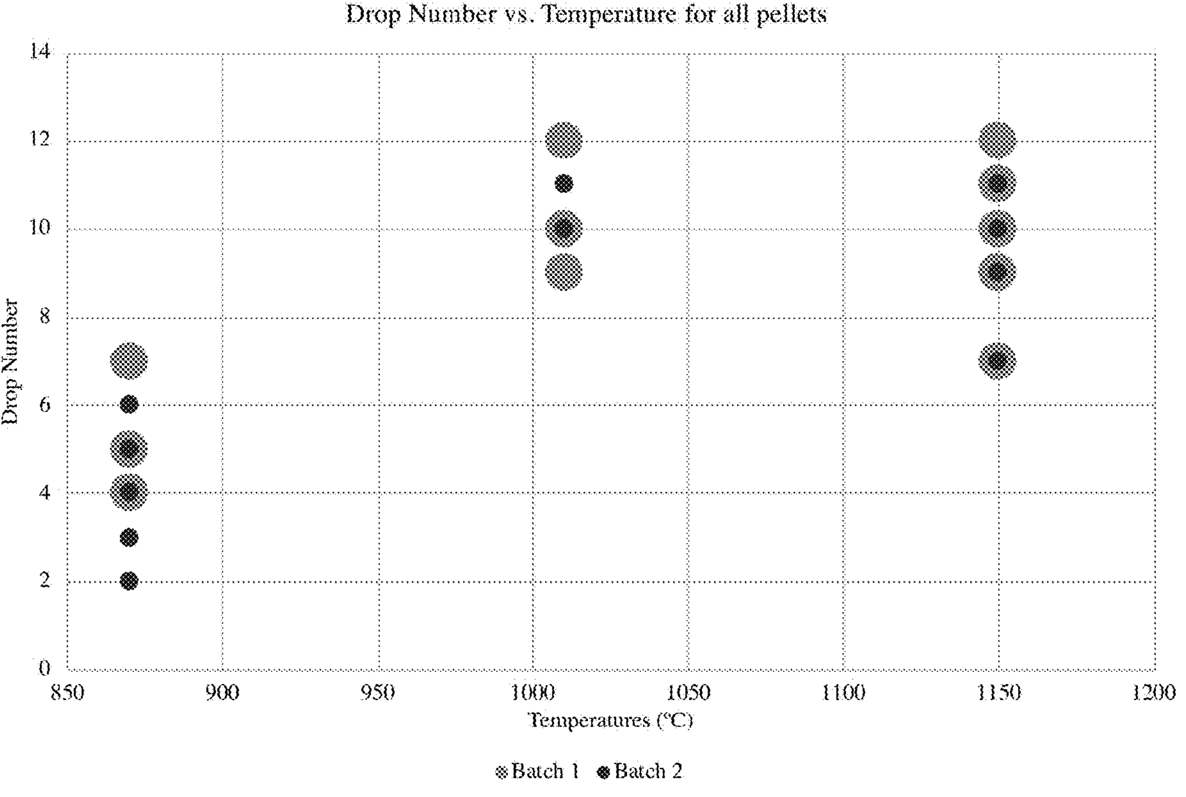
FIG. 14. Drop number versus temperature of induration for pellets of batch 1 and 2.

Finally, FIG. 14 shows a comparison between drop test values between batch 1 and batch 2 fired pellets. Pellets indurated above 1000° C. are shown to withstand multiple drops and are considered durable enough for handling and transportation in a manner typical of an industrial pelletizing plant.

TABLE 11

Apparent porosity and Percent Reduction of batch 1 pellets.

| Pellet Type | Temper-ature (Celsius) | Time (minutes) | Apparent Porosity (%) | Percent Reduction (%) |
|---|---|---|---|---|
| 0PS-1B-3LS | 870 | 90 | 43.33 | 47.2 |
| 0PS-1B-3LS | 1150 | 30 | 44.68 | 75.2 |
| 1PS-1B-3LS | 870 | 30 | 47.46 | 42.4 |
| 1PS-1B-3LS | 1150 | 90 | 47.92 | 84.7 |
| 0PS-0B-3LS | 870 | 30 | 15.00 | 34.6 |
| 0PS-0B-3LS | 1150 | 90 | 45.45 | 76.2 |
| 1PS-0B-3LS | 870 | 90 | 45.00 | 51.8 |
| 1PS-0B-3LS | 1150 | 30 | 46.81 | 78.6 |
| 0PS-1B-0LS | 870 | 30 | 36.84 | 57.4 |
| 0PS-1B-0LS | 1150 | 90 | 39.71 | 75.9 |
| 1PS-1B-0LS | 870 | 30 | 48.00 | 54.7 |
| 1PS-1B-0LS | 1150 | 90 | 44.44 | 75.4 |
| 0PS-0B-0LS | 870 | 90 | 44.44 | 49.6 |
| 0PS-0B-0L5 | 1150 | 30 | 47.78 | 75.1 |
| 1PS-0B-0LS | 870 | 30 | 30.61 | 50.4 |
| 1PS-0B-0LS | 1150 | 90 | 44.64 | 68.5 |
| 0.5PS-0.5B-1.5LS | 1010 | 60 | 43.33 | 63.2 |
| 0.5PS-0.5B-1.5LS | 1010 | 60 | 43.28 | 60.5 |
| 0.5PS-0.5B-1.5LS | 1010 | 60 | 46.94 | 64.7 |

TABLE 12

Apparent porosity and Percent Reduction of batch 2 pellets.

| Pellet Type | Temper-ature (Celsius) | Time (minutes) | Apparent Porosity (%) | Percent Reduction (%) |
|---|---|---|---|---|
| 0PS-1B-3LS | 870 | 90 | 43.3 | 45.4 |
| 0PS-1B-3LS | 1150 | 30 | 63.3 | 72.3 |
| 1PS-1B-3LS | 870 | 30 | 42.3 | 43.7 |
| 1PS-1B-3LS | 1150 | 90 | 42.4 | 86.5 |
| 0PS-0B-3LS | 870 | 30 | 28.6 | 36.8 |
| 0PS-0B-3LS | 1150 | 90 | 47.6 | 73.4 |
| 1PS-0B-3LS | 870 | 90 | 32.1 | 51.3 |
| 1PS-0B-3LS | 1150 | 30 | 42.1 | 74.3 |
| 0PS-1B-0LS | 870 | 30 | 20.0 | 56.3 |
| 0PS-1B-0LS | 1150 | 90 | 48.8 | 75.4 |
| 1PS-1B-0LS | 870 | 30 | 31.7 | 54.4 |
| 1PS-1B-0LS | 1150 | 90 | 51.9 | 75.3 |
| 0PS-0B-0LS | 870 | 90 | 15.2 | 45.3 |
| 0PS-0B-0LS | 1150 | 30 | 42.2 | 74.2 |
| 1PS-0B-0LS | 870 | 30 | 20.5 | 54.3 |
| 1PS-0B-0LS | 1150 | 90 | 40.0 | 67.3 |
| 0.5PS-0.5B-1.5LS | 1010 | 60 | 42.1 | 65.1 |
| 0.5PS-0.5B-1.5LS | 1010 | 60 | 48.9 | 68.9 |
| 0.5PS-0.5B-1.SLS | 1010 | 60 | 47.7 | 70.2 |

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the detailed description is to be regarded as illustrative in nature and not restrictive.

All references disclosed herein, whether patent or non-patent, are hereby incorporated by reference as if each was included at its citation, in its entirety. In case of conflict between reference and specification, the present specification, including definitions, will control.

Although the present disclosure has been described with a certain degree of particularity, it is understood the disclosure has been made by way of example, and changes in detail or structure may be made without departing from the spirit of the disclosure as defined in the appended claims.

We claim:

1. A ore pellet comprising:

automotive paint sludge; and an ore.

2. The ore pellet of claim 1 comprising bentonite, limestone, a clay, or combinations thereof.

3. The ore pellet of claim 2, wherein the ore pellet comprises a clay, limestone, or a combination thereof.

4. The ore pellet of claim 2, wherein the ore is selected from magnetite ore, hematite ore, or combinations thereof.

5. The ore pellet of claim 4, wherein the clay is an expanding clay comprising phyllosilicate.

6. The ore pellet of claim 5, wherein the clay is bentonite.

7. The ore pellet of claim 6, wherein:

the ore comprises one or more of the following compounds: n-buthyl acetate; xylene; butan-1-ol; 1,3,5-triazine-2,4,6-triamine; polymer with formaldehyde; butylated ethylbenzene; petroleum naphta, hydrotreated light; 2-(2-butoxyethoxy) ethanol; heptane; petroleum naphta light alkylate; solvent petroleum naphta light a; petroleum naphta; hydrodesulphurized heavy 1,2,4-trimethylbenzene; solvent petroleum naphta, medium aliphatic; methanol; melamine formaldehyde; cumene; 3-methacryloxypropytrimethoxy-silane; polymethylmethacrylate; carbon black; calcium carbonate; thickener; triethylamine; toluene; drying agents; talc; polycarboxylic acid; methyl-ethyl-cetoxime; and bonding agent; or the paint sludge comprises one or more of the following compounds: a flocculant comprising acetic acid and ammonium chloride; a detackifier for water-based paint sludge comprising aluminum sulfate and ammonium, diallyl-dimethyl-, chloride, polymers; and a detackifier for solvent-based paint sludge comprising aluminum sulfate and amines, polyethyl-enepoly-, polymers with 1,2-dichloro-ethane.

8. A method of recycling automotive paint sludge, comprising;

combining automotive paint sludge with an ore to create an ore composition;

shaping the ore composition to form a pellet; and drying the pellet to aid in hardening the pellet.

9. The method of claim 8, wherein the combining step also includes adding bentonite, limestone, clay, or a combination thereof.

10. The method of claim 9, wherein the clay is an expanding clay comprising phyllosilicate.

11. The method of claim 9, wherein the ore is selected from magnetite ore, hematite ore, or combinations thereof.

12. The method of claim 11, wherein:

the ore composition comprises one or more of the following compounds: n-buthyl acetate; xylene; butan-1-ol; 1,3,5-triazine-2,4,6-triamine; polymer with formaldehyde; butylated ethylbenzene; petroleum naphta, hydrotreated light; 2-(2-butoxyethoxy) ethanol; heptane; petroleum naphta light alkylate; solvent petroleum naphta light a; petroleum naphta; hydrodesulphurized heavy 1,2,4-trimethylbenzene; solvent petroleum naphta, medium aliphatic; methanol; melamine formaldehyde; cumene; 3-methacryloxypropytrimethoxy-silane; polymethylmethacrylate; carbon black; calcium carbonate; thickener; triethylamine; toluene; drying agents; talc; polycarboxylic acid; methyl-ethyl-cetoxime; and bonding agent; or the paint sludge comprises one or more of the following compounds: a flocculant comprising acetic acid and ammonium chloride; a detackifier for water-based paint sludge comprising aluminum sulfate and ammonium, diallyl-dimethyl-, chloride, polymers; and a detackifier for solvent-based paint sludge comprising aluminum sulfate and amines, polyethyl-enepoly-, polymers with 1,2-dichloro-ethane.

13. A method of pelletizing an ore, comprising;

combining automotive paint sludge with the ore to create an ore composition;

shaping the ore composition to form a pellet; and drying the pellet to aid in hardening the pellet.

14. The method of claim 13, wherein the combining step also includes clay, bentonite, limestone, and combinations thereof.

15. The method of claim 14, wherein the ore is selected from magnetite ore, hematite ore, or combinations thereof.

16. The method of claim 15, wherein the clay is an expanding clay comprising phyllosilicate.

17. The method of claim 16, wherein:

the ore composition comprises one or more of the following compounds: n-buthyl acetate; xylene; butan-1-ol; 1,3,5-triazine-2,4,6-triamine; polymer with formaldehyde; butylated ethylbenzene; petroleum naphta, hydrotreated light; 2-(2-butoxyethoxy) ethanol; heptane; petroleum naphta light alkylate; solvent petroleum naphta light a; petroleum naphta; hydrodesulphurized heavy 1,2,4-trimethylbenzene; solvent petroleum naphta, medium aliphatic; methanol; melamine formaldehyde; cumene; 3-methacryloxypropytrimethoxy-silane; polymethylmethacrylate; carbon black; calcium carbonate; thickener; triethylamine; toluene; drying agents; talc; polycarboxylic acid; methyl-ethyl-cetoxime; and bonding agent; or the paint sludge comprises one or more of the following compounds: a flocculant comprising acetic acid and ammonium chloride; a detackifier for water-based paint sludge comprising aluminum sulfate and ammonium, diallyl-dimethyl-, chloride, polymers; and a detackifier for solvent-based paint sludge comprising aluminum sulfate and amines, polyethyl-enepoly-, polymers with 1,2-dichloro-ethane.

18. The method of claim 16, wherein the drying is performed at a temperature greater than 850 degrees C. and less than about 1200 degrees C.

19. The method of claim 18, wherein the temperature is greater than 1000 degrees C.

20. The method of claim 13, wherein the drying is performed at a temperature greater than 850 degrees C. and less than about 1200 degrees C.

* * * * *